Patented Oct. 26, 1937

2,096,753

UNITED STATES PATENT OFFICE 2,096,753

SHOWERPROOF FABRICS AND PROCESS OF MAKING THE SAME

Edward Arthur Murphy and Evelyn William Madge, Wylde Green, Birmingham, England, assignors to Dunlop Rubber Company Limited, London, England, a British company No Drawing. Application December 13, 1935, Serial No. 54,349. In Great Britain December 22, 1934

9 Claims. (Cl. 91—68)

Our invention relates to improvements in showerproof fabrics, particularly to fabrics of woven fibrous material and unmasticated rubber composition which are porous to gases and vapors and impenetrable to a small head of aqueous liquid and which preserve to a large extent, if not entirely, their appearance and texture. The invention also relates to a process for making such fabrics.

Heretofore rubber-coated fabrics of either single or double texture such as used for garments, waterproof clothing, dipped goods such as footwear and certain gloves have been made from aqueous dispersions of rubber material treated or compounded to render them less absorptive or more resistant to water. In such rubber-coated goods a water resistant material has been deposited or formed in a continuous layer of rubber composition on the surface of the fabric by rendering insoluble a water soluble soap in the rubber composition to produce the water resistant material. The ingredients used to render the rubber coating water resistant are however relatively limited and moreover the resulting product does not preserve the texture of the fabric but has the texture of a continuous rubber surface.

In our present invention a showerproof fabric suitable for raincoat material, waterproof garments or waterproof linings is produced which retains the fabric texture and porosity to gases and vapors while being impenetrable to water.

In forming the fabric of our present invention the fibrous or woven fabric is treated, as by immersion or other suitable manner, with an aqueous dispersion of rubber material at a concentration of not more than approximately 20% and preferably not more than approximately 10% of total solids and in admixture with materials or ingredients which upon subsequent treatment with suitable reagents make the rubber water-repellent.

If an aqueous dispersion of approximately 20% total solids concentration is employed the resulting product although not possessing a continuous coating of rubber is nevertheless definitely "rubbery". Employing, however, an aqueous dispersion of not more than 10% total solids concentration a non-rubbery product is produced. It is usually desirable according to the invention to produce finished showerproof fabric having a non-rubbery nature.

The materials, either added directly or derived from ingredients, which make rubber water-repellent employed in accordance with the invention are solid organic materials which have a high angle of contact with respect to water. Such materials are for example the higher members of the homologous series i. e. paraffins, esters, fatty acids, alcohols; such substances as zinc stearate, magnesium stearate i. e. the solid salts of the fatty acids, chlorinated compounds or waxes such as halowax.

An advantage according to the invention is that hard waxes can be employed in admixture with the aqueous dispersions of rubber aforesaid. It is known to produce waterproof fabrics by immersing the fabric in a petroleum solution of a soft wax. Although a soft wax readily marks and so it would be desirable to employ a hard wax, nevertheless heretofore a hard wax could not be used successfully because these waxes crack far too easily. If however, in accordance with the present invention a hard wax is admixed with an aqueous dispersion of rubber the presence of the rubber makes the hard wax flexible and thus permits its use for the production of showerproof fabrics.

The coagulation of the aqueous dispersion of rubber or the like can be effected by heat, e. g. by drying or by contacting with a suitable coagulant.

The emulsions or dispersions of rubber or the like comprise those consisting of rubber, guttapercha, balata or similar vegetable resins occurring naturally or in vlucanized condition or artificially obtained. Such artificial aqueous dispersions may include those of coagulated rubber, vulcanized rubber, waste or reclaim. All these materials are included in the term "rubber" as used in this specification.

If desired, any of the aforementioned dispersions may be used alone or in admixture with one another.

Any of the aforesaid dispersions may contain the usual known compounding and vulcanizing ingredients and/or may be in the first instance in concentrated form.

Concentrates such as are obtained in Patent No. 1,846,164 to which may be added any one or more of the usual known compounding ingredients may also be employed.

The following is a specific example of the manner in which the invention may be carried into effect.

Untreated gabardine or fabric known as Indiana fabric is immersed in a bath or rubber latex mixing of approximately 10% concentration and of composition—rubber 50 parts by weight, carnauba wax 50 parts by weight. After soaking, the gabardine or Indiana fabric is removed from the bath, washed superficially and immersed in a 10% solution of aluminium chloride or similar metallic salt preferably trivalent or divalent such as iron or zinc or magnesium. The aluminium chloride insolubilizes the soap and other materials used in the preparation of the carnauba wax dispersion and also coagulates the rubber latex. The cloth is then rinsed in water to remove the excess aluminium salts, and subsequently dried and ironed. The final product is strongly water-repellent but porous to gases and vapors.

Having now particularly described our invention we claim:

1. In the manufacture of showerproof fabrics, the process which comprises immersing a fabric in an aqueous dispersion containing substantially equal parts by weight of rubber material and a solid water repellant material, the concentration of total solids being about 20% in said dispersion, superficially washing the fabric and precipitating the dispersed material in said fabric.

2. In the manufacture of showerproof fabrics, the process which comprises immersing the fabric in an aqueous dispersion containing substantially equal parts by weight of a rubber material and a solid water repellant material, the concentration of total solids being not over about 10% and effective to render the fabric showerproof yet pervious to the passage of gas.

3. In the manufacture of showerproof fabrics, the process which comprises immersing the fabric in an aqueous dispersion containing substantially equal parts by weight of a rubber material and a solid water repellant wax, the concentration of total solids being not over about 10% and effective to render the fabric showerproof without imparting a rubbery texture thereto.

4. In the manufacture of showerproof fabrics, the process which comprises immersing the fabric in an aqueous dispersion containing substantially equal parts by weight of a rubber material and a water repellant wax containing not over 20% of solid materials and removing the excess of said materials from the pores of said fabric.

5. In the manufacture of showerproof fabrics, the process which comprises immersing the fabric in a bath of rubber latex mixing of approximately 10% concentration and of a composition of equal parts of rubber and carnauba wax by weight.

6. In the manufacture of showerproof fabrics, the process which comprises immersing untreated fabric such as gabardine or Indiana fabric in a bath of rubber latex of approximately 10% solid concentration and of a composition of equal parts by weight of rubber and carnauba wax, superficially washing the fabric and precipitating the dispersed material in the fabric.

7. In the manufacture of showerproof fabrics, the process which comprises immersing the fabric in a bath of not over approximately 10 percent solid concentration and of a composition of water repellent wax and rubber material in proportion to preserve the predominantly textile characteristics and permeability to gases of said fabric.

8. A showerproof fabric such as gabardine or Indiana fabric substantially impregnated with a mixture of approximately equal parts of a hard wax and rubber material so as to preserve the predominantly textile characteristics and permeability to gases of said fabric.

9. A showerproof fabric substantially impregnated with a mixture of water repellent hard wax and a rubber material by the method defined in claim 7.

EDWARD ARTHUR MURPHY.
EVELYN WILLIAM MADGE.